United States Patent
Krautkremer et al.

(10) Patent No.: US 9,356,851 B2
(45) Date of Patent: *May 31, 2016

(54) APPLICATION SERVICE LEVEL MEDIATION AND METHOD OF USING THE SAME

(71) Applicants: Todd Krautkremer, Los Gatos, CA (US); Guy Riddle, Los Gatos, CA (US); Bob Purvy, San Jose, CA (US)

(72) Inventors: Todd Krautkremer, Los Gatos, CA (US); Guy Riddle, Los Gatos, CA (US); Bob Purvy, San Jose, CA (US)

(73) Assignee: Blue Coat Systems, Inc., Sunnyvale, CA (US)

(*) Notice: Subject to any disclaimer, the term of this patent is extended or adjusted under 35 U.S.C. 154(b) by 71 days.

This patent is subject to a terminal disclaimer.

(21) Appl. No.: 13/649,231

(22) Filed: Oct. 11, 2012

(65) Prior Publication Data

US 2013/0155885 A1    Jun. 20, 2013

Related U.S. Application Data

(63) Continuation of application No. 12/480,089, filed on Jun. 8, 2009, now Pat. No. 8,300,545, which is a continuation of application No. 11/286,021, filed on Nov. 23, 2005, now Pat. No. 7,545,752, which is a continuation of application No. 09/710,442, filed on Nov. 10, 2000, now abandoned.

(51) Int. Cl.
   *H04L 12/26*   (2006.01)
   *H04L 29/08*   (2006.01)
   *H04L 29/06*   (2006.01)

(52) U.S. Cl.
   CPC ............ *H04L 43/0852* (2013.01); *H04L 67/28* (2013.01); *H04L 67/2819* (2013.01); *H04L 69/02* (2013.01); *H04L 43/16* (2013.01)

(58) Field of Classification Search
   CPC .................................................. H04L 43/0852
   See application file for complete search history.

(56) References Cited

U.S. PATENT DOCUMENTS

| | | | |
|---|---|---|---|
| 5,521,907 A | 5/1996 | Ennis et al. | 370/253 |
| 6,041,352 A | 3/2000 | Burdick et al. | 709/224 |
| 6,058,102 A | 5/2000 | Drysdale et al. | 370/252 |
| 6,115,393 A | 9/2000 | Engel et al. | 370/469 |
| 6,134,237 A | 10/2000 | Brailean et al. | 370/394 |
| 6,215,772 B1 | 4/2001 | Verma | 370/236 |
| 6,321,264 B1 | 11/2001 | Fletcher et al. | 709/224 |
| 6,421,323 B1 | 7/2002 | Nelson et al. | 370/241 |
| 6,446,028 B1 | 9/2002 | Wang | 702/186 |
| 6,556,659 B1 | 4/2003 | Bowman-Amuah | 379/32 |
| 6,560,564 B2 | 5/2003 | Scarlat et al. | 702/186 |
| 6,769,029 B1 | 7/2004 | Seki et al. | 709/232 |
| 7,492,720 B2 | 2/2009 | Pruthi et al. | 370/252 |
| 7,545,752 B2 | 6/2009 | Krautkremer et al. | 370/252 |
| 8,300,545 B2 * | 10/2012 | Krautkremer et al. | 370/252 |
| 2002/0152303 A1 | 10/2002 | Dispensa | 709/224 |
| 2002/0177977 A1 * | 11/2002 | Scarlat et al. | 702/186 |

* cited by examiner

Primary Examiner — Jason Mattis

(74) Attorney, Agent, or Firm — Baker Botts L.L.P.

(57) ABSTRACT

A method and apparatus for using an application layer demarcation point are described. In one embodiment, the method comprises monitoring end-to-end performance of a network application at an application demarcation point in a network, and mediating between provider infrastructure and customer infrastructure based on results of monitoring.

17 Claims, 9 Drawing Sheets

```
/************************************************************************
****
*
* Module Name: drixoral.c
*
* Abstract: Congestion Index Measurement
* Author:   Guy Riddle
* Created: 991102
*
* Copyright Packeteer, Inc. 1999-2001

************************************************************************
***
*/ define PACKET_PATH
include <artist.h>
#include <mecom.h>
#include <kmalloc.h>
#include "../tcp.h"

if _PSAPPV define MY_DEBUG_LEVEL gTcpRTMDebugLevel extern int              gTcpRTMDebugLevel;

define    meTclassCongestionAccum(tc, msec)            \
            meTclassPktExchMsecsAccum(tc,
msec),meTclassPktExchSamplesAccum(tc, 1)

#define DRIX_SEQ_SPOTS       7    /* chosen to avoid kmalloc roundup wasteage */
```

Fig. 4A

```
typedef struct {
    SEQ             lastseq;
    SEQ             lastack;
    SEQ             seq[DRIX_SEQ_SPOTS];
    TICK            time[DRIX_SEQ_SPOTS];
} CongestionMeasurement, *CongestionMeasurementPtr;

void
drixoralMeasureCongestion(
    TCB_INFO_PTR                info
){
    TCB_PTR                     tcb;
    ArtMeasurementPtr           am;
    CongestionMeasurementPtr    drix;
    TCLASS_PTR                  tc;
    DIRECTION                   dir;
    SEQ                         seq;
    UINT32                      msec;
    int                         i, leave;

whereStr("xxxMeasureCongestion");

tcb = info->tcb;
    am = &tcb->artData;
    dir = info->dir;

blurt3("seq %d ack %d flags %X", info->header.seq, info->header.ack, info->header.flags);
    blurt4("dir %d len %d end %d tcb %X", dir, info->header.dataLen, info->header.seq + info->header.dataLen, tcb);

if(info->header.dataLen > 0){
```

Fig. 4B

```
if(!am->drixoral[dir])
        am->drixoral[dir] =
kmallocz(sizeof(CongestionMeasurement), M_DRIXORAL);

if((drix = am->drixoral[dir])){
        seq = info->header.seq + info->header.dataLen;
        if(info->header.flags & (TCP_F_SYN|TCP_F_FIN))
            seq++;

if(SEQ_GT(seq, drix->lastseq) || !drix->lastseq){
            for(i = 0; i < DRIX_SEQ_SPOTS; i++)
                if(!drix->seq[i])
                    break;

if(i < DRIX_SEQ_SPOTS){
                drix->seq[i] = seq;
                drix->time[i] = info->bcb->tick.ticks;
            }else
                info2("req %d spot overflow tcb %X", seq, tcb);

drix->lastseq = seq;
        }
    }
} dir = OTHER_DIRECTION(info->dir);

if(IS_FLAG_SET(info->header.flags, TCP_F_ACK) &&
   (drix = am->drixoral[dir])
```

Fig. 4C

```
            && (SEQ_GT(info->header.ack, drix->lastack) || !drix-
>lastack)){
                leave = 0;

for(i = 0; i < DRIX_SEQ_SPOTS; i++)
                    if(!drix->seq[i])
                        continue;
                    else if(SEQ_EQ(info->header.ack, drix-
>seq[i])){
                            if(info->header.dataLen == 0){
                                msec =
TICKS_TO_MSECS_ROUNDED(info->bcb->tick.ticks - drix-
>time[i]);

if((tc = tclassIdToTclassFast(tcb-
>halfConns[dir].gear.classId))){ meTclassCongestionAccum(tc, msec);

blurt4("sample %d msec %d
class %s dir %d", i, msec, tc->name, dir);
                                }else
                                    attn1("no class for TCB %X",
tcb);
                            } drix->seq[i] = 0;
                    }else if(SEQ_GT(info->header.ack, drix-
>seq[i]))
                        drix->seq[i] = 0;
                    else
                        leave++;

if(leave)
```

Fig. 4D

```
                    drix->lastack = info->header.ack;
            else{
                    kfree(drix);
                    am->drixoral[dir] = 0;
            }
        }
    } void
drixoralCleanup(
        TCB_PTR                                  tcb
){
        ArtMeasurementPtr                        am;
        CongestionMeasurementPtr                 drix;

am = &tcb->artData;

if((drix = am->drixoral[DIR_INBOUND])){
                kfree(drix);
                am->drixoral[DIR_INBOUND] = 0;
        } if((drix = am->drixoral[DIR_OUTBOUND])){
                kfree(drix);
                am->drixoral[DIR_OUTBOUND] = 0;
        }
}
#endif /* _PSAPPV */
```

APPLICATION SERVICE LEVEL MEDIATION AND METHOD OF USING THE SAME

RELATED APPLICATIONS

This application is a continuation of application Ser. No. 12/480,089 filed Jun. 8, 2009, and entitled "Application Service Level Mediation and Method of Using the Same," now U.S. Pat. No. 8,300,545, which is a continuation of application Ser. No. 11/286,021 filed Nov. 23, 2005, entitled "Application Service Mediation and Method of Using the Same," now U.S. Pat. No. 7,545,752, which is a continuation of application Ser. No. 09/710,442 filed Nov. 10, 2000, entitled "Application Service Mediation and Method of Using the Same," now abandoned, the contents of which are hereby incorporated by reference in their entirety.

TECHNICAL FIELD OF THE INVENTION

The present invention relates to the field of network administration; more particularly, the present invention relates to application service providers and their use of an application layer demarcation point to monitor performance.

BACKGROUND OF THE INVENTION

Services delivered by providers of networked application services, by their nature, span a variety of provider and customer owned and managed infrastructures. For example, the application services begin at a provider or customer owned hosting platform within a provider or customer owned data center infrastructure, travel across one or more wide-area networks (WANs) owned and managed by one or more service providers and across one or more customer owned WAN and LAN infrastructures, before reaching a customer-owned desktop or mobile computing platform.

As application traffic traverses service boundaries between the source provider and infrastructure supplier providers and source provider and customers, the source provider's ability to effect overall service-levels is greatly diminished. Because there is no application-aware demarcation point that aligns with the source provider's service boundary, there is no easy way to establish an actionable service-level agreement. A source provider cannot control the performance of application service over portions of infrastructure it does not own or control.

Current approaches to application performance monitoring and service-level management measure end-to-end (server to desktop) performance without regard to the service provider boundaries. This lack of a clear demarcation point between provider and customer impairs the provider's ability to deliver actionable service-level agreements and results in significant service costs in mediating between provider and customer for infrastructure-induced performance problems.

SUMMARY OF THE INVENTION

A method and apparatus for using an application layer demarcation point are described. In one embodiment, the method comprises monitoring end-to-end performance of a network application at an application demarcation point in a network, and mediating between provider infrastructure and customer infrastructure based on results of monitoring.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 4A, 4B, 4C, 4D, and 4E illustrate one embodiment of software code executed by one embodiment of network device.

DETAILED DESCRIPTION OF THE INVENTION

Figure 1:
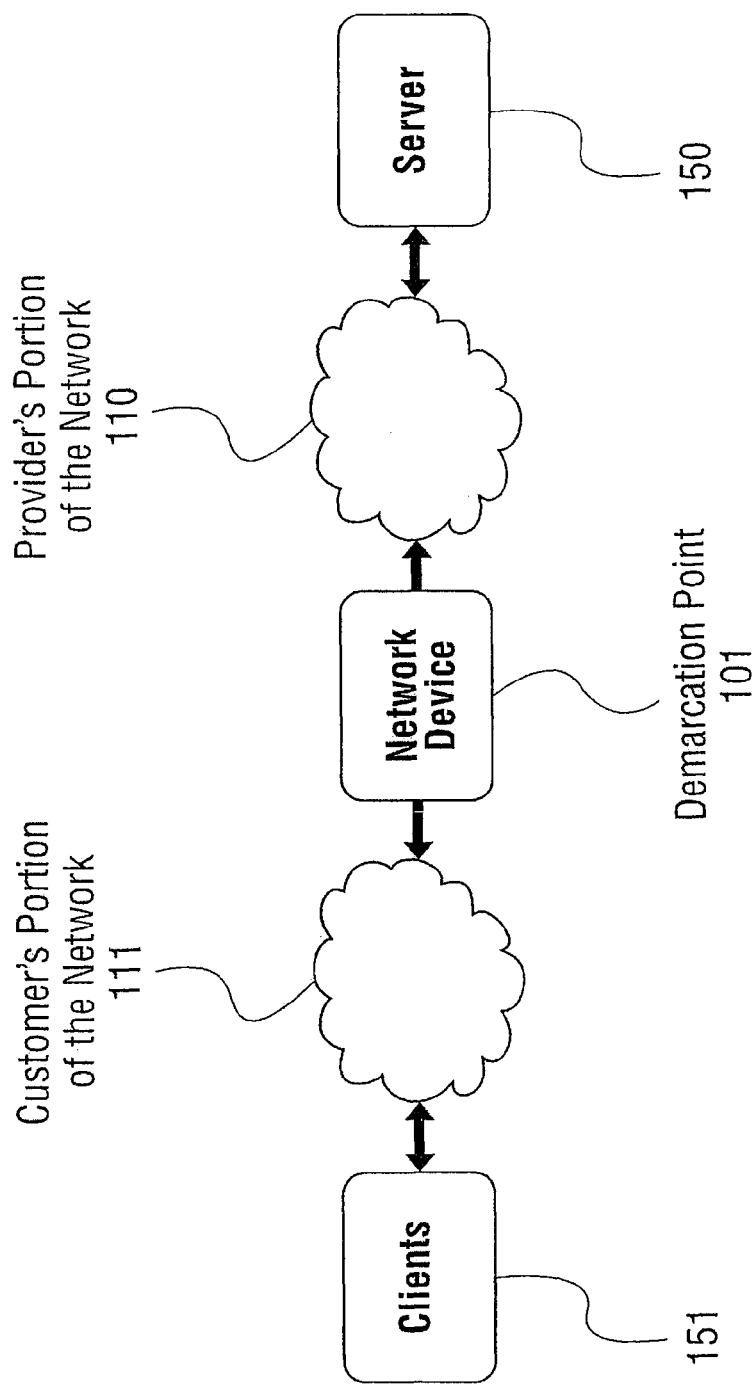
FIG. 1 illustrates a network environment that includes an application level demarcation point.

A method and apparatus for using an application layer demarcation point are described. The application layer demarcation (demarc) point is provided to enable providers of application services to measure the quantitative performance and qualitative performance (e.g., an application is too slow) of networked applications end-to-end and to mediate between performance impacts of the underlying service layers and service boundaries. Thus, a service boundary demarcation point for the application is provided that enables source providers of application services to mediate between the underlying infrastructure which they own and manage (or its supplier partners) and the customer's infrastructure.

Since a service provider cannot manage customer infrastructure it does not own or control, proving an application-aware demarcation and mediation point allows a service provider to develop actionable service-level agreements that align with its service boundary. In this manner, a service provider delivering service at the application layer may use a demarcation point at the application layer to enable verification that the service was delivered. This is performed without changing the clients or servers in the network.

Using the application layer demarcation allows for monitoring and measuring performance (e.g., congestion or a lack thereof) and whether performance problems (e.g., packet discard and retransmission that slows overall response time, etc.) are on the service side or on the customer side of the network. In one embodiment, in regard to congestion, identifying performance problems includes identifying the class of traffic that is being effected in order to help facilitate solving the problem for the customer and/or providing services to the customer to remove or reduce the problem.

The demarcation also allows for availability measures to be made by making determinations as, for example, to what time the network carries traffic or as to what time a host is up and running In one embodiment, the monitoring and mediation functionality reside on an appliance platform that is installed, usually by the service provider, at the service boundary between the providers' and customers' infrastructure. This appliance measure the end-to-end performance and service-levels of application services and determines from where a service-affecting problem is emanating. Moreover, the appliance becomes an application-aware demarcation point that allows service provider to create, monitor and manage service-level agreements for the portion of the end-to-end service delivers that actually traverses its infrastructure.

The demarcation point allows the use of data collected relative to the demarcation point as a tool, such as a diagnostic tool to correct identified problems in the network or a business tool to provide business opportunities. For example, by being able to have an application demarcation point, service providers are able to indicate that users need additional resources (e.g., bandwidth resources, additional server capacity, etc.) and are able to indicate to users in a measurable and discrete way that they need to obtain those additional resources. Thus, the demarcation point allows a service provider to determine whether appropriate additional services should be presented to customers. Such services may be provided at an additional cost to the customers. Furthermore, the application demarcation point may be used to perform capacity planning, particularly by being able to determine what each customer requires and ensuring that those requirements are met.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 illustrates a network environment that includes an application level demarcation point. Referring to FIG. 1, an application demarcation point 101 is located between a provider portion 110 of the network and a customer portion 111 of the network. Provider portion 110 of the network couples one or more servers (e.g., server 150) to the network, while client portion 111 of the network couples one or more clients (e.g., client 151) to the network. In one embodiment, demarcation point 101 is located logically between customer portion 111 and provider portion 110 and physically at network appliance, or device 120.

Network device 120 monitors application performance using delay metrics that characterize the delay associated with end-to-end traffic in the network. Such traffic may be that of, for example, interactive applications that are operating with requests and responses to those requests traversing the network. Apart from network delay metrics, other metrics that may be monitored include server delay, packet counts and data rates, and frame relay FECN/BECN (Forward/Backward Explicit Congestion Notification) counts. Also "policy-related" metrics, such as, for example, how often "guaranteed rate" bandwidth failed to be allocated because there was insufficient free bandwidth, may be monitored.

In one embodiment, network device 120 monitors the customer network delay as well as the provider network delay to enable of service-level management. Network device 120 monitors these delays as half round trip delays. In one embodiment, network device 120 monitors the inbound and outbound customer network delay, the inbound and outbound provider network delay, and host latency, and computes a single number which is the sum of these three components. Note that the two customer network delay components do not measure the same request data packet that the inbound provider network delay does. They are computed from seeing the response data packet from the server.

In one embodiment, network device 120 includes a measurement engine to record and maintain statistics and an on-board database to store information indicative of delays occurring in the network. The measurement engine may perform measurements and record information on site specific network delays, server delays, bits per second, lost packets, retransmission count, end-to-end delays, etc. Using this information, a congestion index may be generated. The measurement engine may comprise hardware, software or a combination of both.

Network device 120 may also include management control that accesses the on-board database to determine whether a performance problem exists in the network that is the responsibility of the application service provider. The management control may identify such a problem because a measurement taken by the measurement engine exceeds a predetermined value. In one embodiment, the management control may create histograms to provide a graphical representation of delays (e.g., average delays, cumulative delays, etc.).

If a problem is determined to exist, then the management control may notify the application service provider. In one embodiment, in response to the notification, the application service provider may send an event to notify the customer of the problem and/or offer a service that fixes or alleviates the problem. In an alternative embodiment, the management control sends the event to the customer.

Once a problem attributed to the application service provider's infrastructure has been identified, the application service provider may remedy the situation. For example, if a particular class of traffic is causing congestion, then more bandwidth can be allocated to prioritize traffic differently. Alternatively, network device 120 may shape the traffic to rectify the situation by, for example, controlling competing, non-essential, traffic. That is, traffic may be quantized depending on how much bandwidth a particular user requires for the needs of the various applications.

In an alternative embodiment, network device 120 is installed between a service provider and an affiliate partner, such as, for example, a hosting service provider, application service provider, or a network service provider. In such a case, network device 120 performs mediation between the two providers. In still another alternate embodiment, network device 220, or the point of demarcation, is located at the point of interconnection between administrators.

Figure 2:
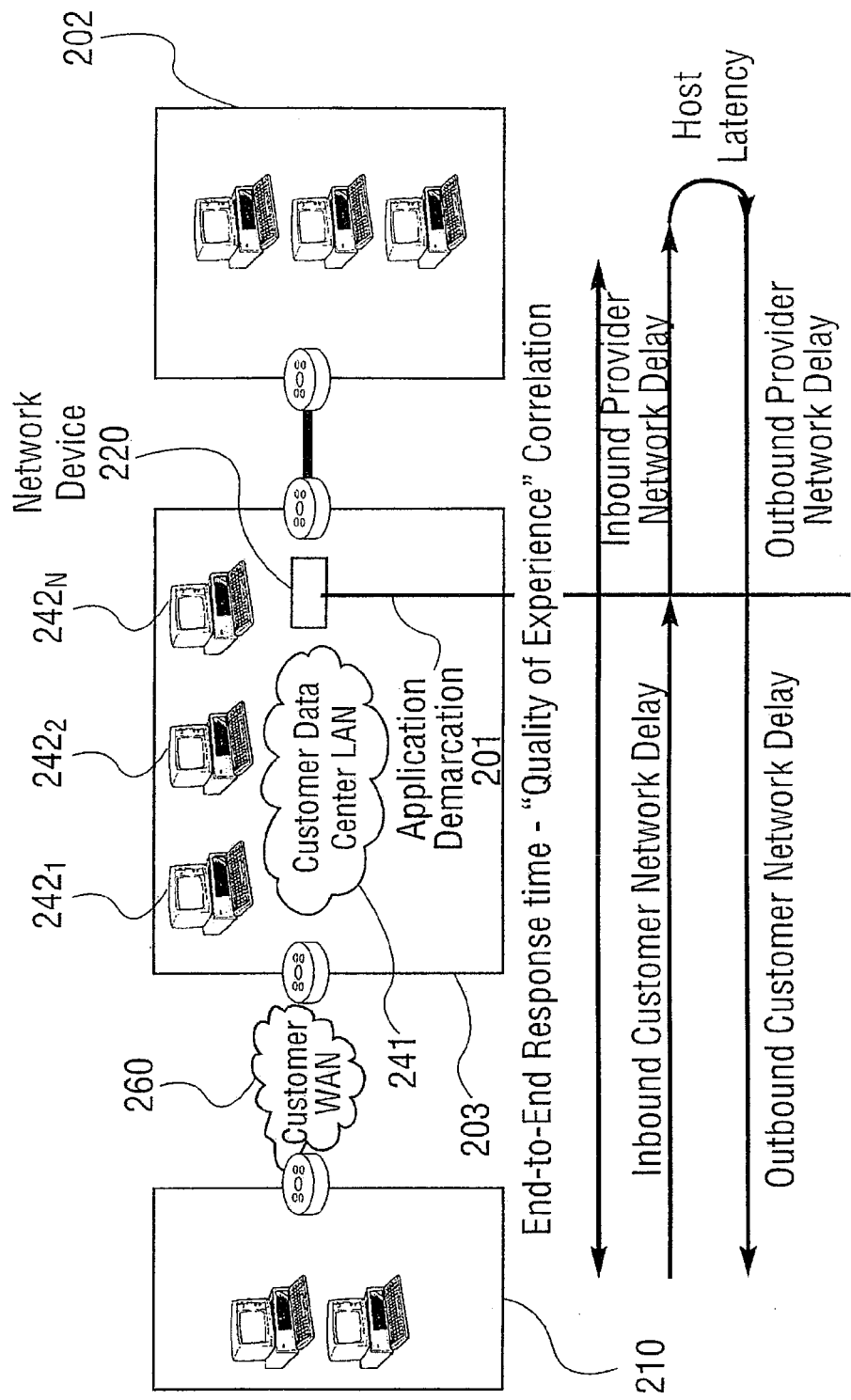
FIG. 2 illustrates an exemplary network environment in which an application demarcation point is utilized.

FIG. 2 illustrates an exemplary network environment in which an application demarcation point is utilized. Referring to FIG. 2, an application service provider (ASP) utilizing a data center 202 is on one side of application demarcation point 201, while a customer data center 203 is on the opposite side of application demarcation point 201. Customer data center 203 comprises a local area network (LAN) (241) coupling computer systems 2421_N and a network device 220. In one embodiment, network device 220 at customer data center 203 couples ASP data center 202 to a customer data center local area network (LAN) 241.

In one embodiment, the customer data center LAN 241 is also coupled to a customer branch 210 via a wide area network (WAN) 260. Customer branch 210 may comprises one or more computer systems networked together.

Network device 220 gathers information to ensure that the service is delivered to the customer (e.g., customer branch 210). In one embodiment, network device 220 generates a measurement that quantifies network congestion on either side of application demarcation point 201. This allows an application service provider, via a network manager, to isolate a problem to one side of the network device. In one embodiment, this is performed in a non-intrusive way so that traffic flow is not interrupted.

In one embodiment, network device 220 may also use the information to create information to convince a customer that the service desired from the service provider has been delivered.

Figure 3:
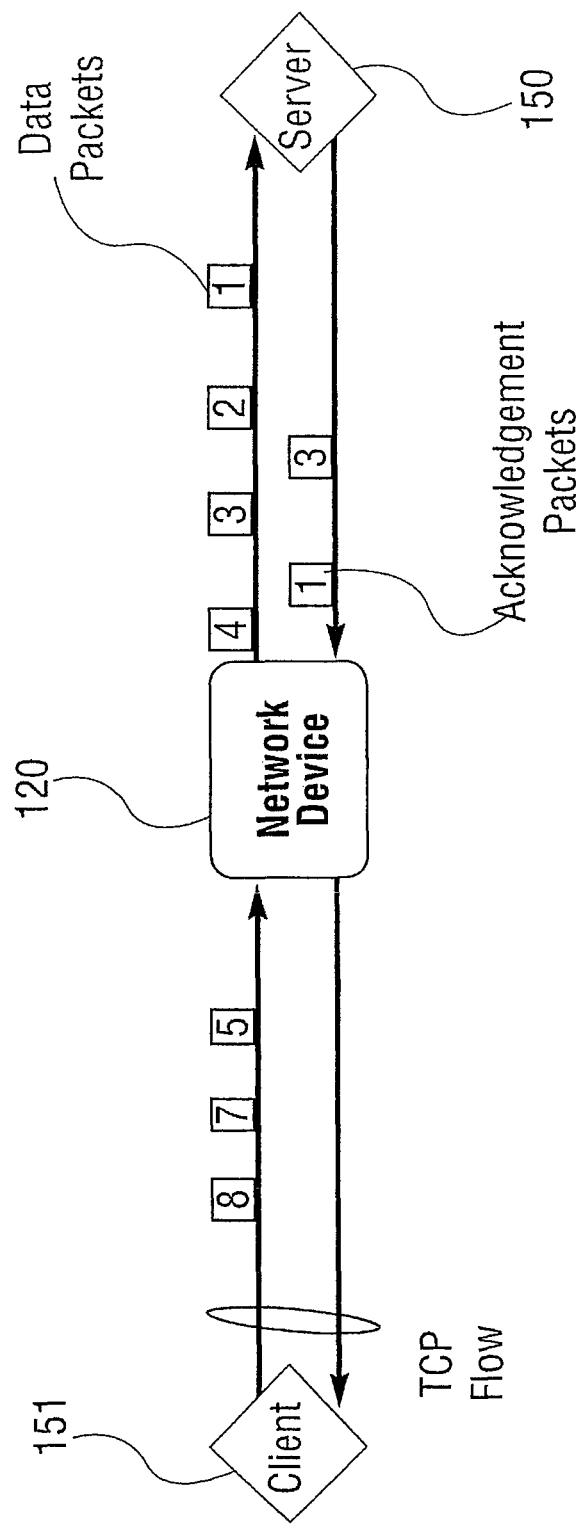
FIG. 3 is an alternative view of FIG. 1.

FIG. 3 is an alternative view of FIG. 1. Referring to FIG. 3, network device 120 monitors the TCP flows that traverse the network between client 151 on the customer side of the network and server 150 on the provider side of the network. With TCP traffic, there are a series of data packets flowing in both directions. Such traffic flows are common, particularly with respect to web-based applications. The flows are such that data packets travel in one direction while acknowledgement packets flow in the other direction. Some acknowledgement packets may include data that is traveling in the other direction and vice versa.

Each of the data packets have sequence numbers, which are indications of have many bytes have been transferred since the beginning of the connection where an "initial sequence number" was negotiated (which is not usually 0). The sequence numbers are usually in increasing order, except where there has been a retransmission or packets are arriving out-of-order. The sequence numbers used in FIG. 3 are not actual sequence numbers. Instead, for purposes of explanation, a simplified set of numbers have been used.

FIG. 3 shows data packets 1, 2, 3, and 4 traveling through network device 120 to server 150 (in that order) with associated acknowledgment packets 1 and 3 traveling from server 150 towards network device 120. (Note that there are no acknowledgement packets for packets 2 and 4 as acknowledgement packets may not be generated for all data packets in a TCP-based network.) Also, packets 5, 7 and 8 travel from client 151 towards network device 120. There is no packet 6 to indicate that packet 6 has been lost.

In one embodiment, network device 120, being at an application demarcation point, records the time it encounters packets and their acknowledgements to generate a congestion index. The congestion index is a measurement that quantifies network congestion of either side of the demarcation point. One embodiment of the process used by network device 120 to generate the congestion index is given below.

Exemplary Network Device Software

FIGS. 4A, 4B, 4C, 4D, and 4E illustrate one embodiment of software code executed by one embodiment of network device 120. It should be noted that the operation performed by the software could be implemented in hardware (e.g., logic, circuitry, etc.) as well.

Referring to FIG. 4A, starting at line 3, there are a number of declarations to define variables. Starting at line 31, a structure is defined to keep track of sequence numbers and time stamps on data flows traveling in one direction. Each TCP flow is comprised of two half-flows going in two directions around the same end point with data, at times, being piggy backed onto acknowledgement packets.

At line 60, a test determines if the packet has data in it. If it doesn't have data, processing transitions to line 85.

At lines 61-62, a data structure is allocated to hold sequence numbers and their associated time stamps, if such a data structure has not already been allocated. That is, the first time a packet with data is encountered on a half-flow, a data structure is created to store sequence numbers and their time stamps. Two data structures are allocated for a TCP flow with the dir subcomponent indicating the direction of the flow (e.g., inbound, outbound).

Starting at line 65, the packet sequence number is added to the number of bytes of data to compute the sequence number of the last byte of data in the packet, which is the number that will be contained in the matching acknowledgement packet.

Starting at line 69, the comparison is made between the sequence number of the current packet and the last sequence number that has been seen. If the current sequence number is less than the last sequence number, then it is a duplicate and it is ignored.

Thus, at line 75-76, the sequence number of the packet and the time the packet reached the demarcation point are recorded in a data structure. In one embodiment, this data structure is a fixed size. In one embodiment, a packet depth of 7 is used, which is sufficient to get a good sample of packets from most connections and where a size greater would require at least twice the memory size. Even so, other sizes may be used.

If the packet is not a new packet, the network device processing transitions from line 69 to line 85. Starting at line 85, the packet is examined to see if its acknowledgement flag is set by the sender of the packet. If the packet is not an acknowledgement, the process is done.

If the packet contains an acknowledgement and a data structure is allocated (because data packet times have been recorded) (line 87), the acknowledgement is processed (lines 88-118); otherwise, processing on the packet is finished.

Starting at line 88, the software checks to see if the sequence number of the acknowledgement is not greater than the last acknowledgement that was seen. This would imply that the acknowledgement is a duplicate and should be ignored. Starting at line 91, the process loops through a number of locations in the data structure recording sequence numbers to find if a time has been remembered for the data packet this packet is acknowledging. At line 94, if the sequence number for the acknowledgement is equal to the sequence number of one of the previously recorded packets and the acknowledgement is a naked acknowledgment (i.e., the packet does not include piggyback data), then the software performs a measurement.

Starting at line 96, the software calculates the difference between the time to see the acknowledgement at the demarcation and the time to initially see the data packet. This measurement is converted into milliseconds and refers to the time it took a packet to get from the demarcation point to the other end and the matching acknowledgement to come back. This is the congestion index, which in this embodiment is computed as a millisecond delay. In summary, this method computes a number for a TCP half-flow for each different traffic class. Each half-flow has already been given a classification (e.g., traffic class by the classification engine described below), which is retrieved at line 98. The software stores the congestion index measurement in a database (e.g., database 505 described below) associated with this traffic class.

Once a sample is recorded, starting at line 106, sequence number location in the data structure is set to zero (cleared) so that it can be used for another sequence number of a packet that traverses the network. An optimization at line 115 causes the data structure to be completely cleared when there are no longer samples to process, because there is no outstanding data and the network device is not waiting on an acknowledgement.

Block Diagram of Device

Figure 5:
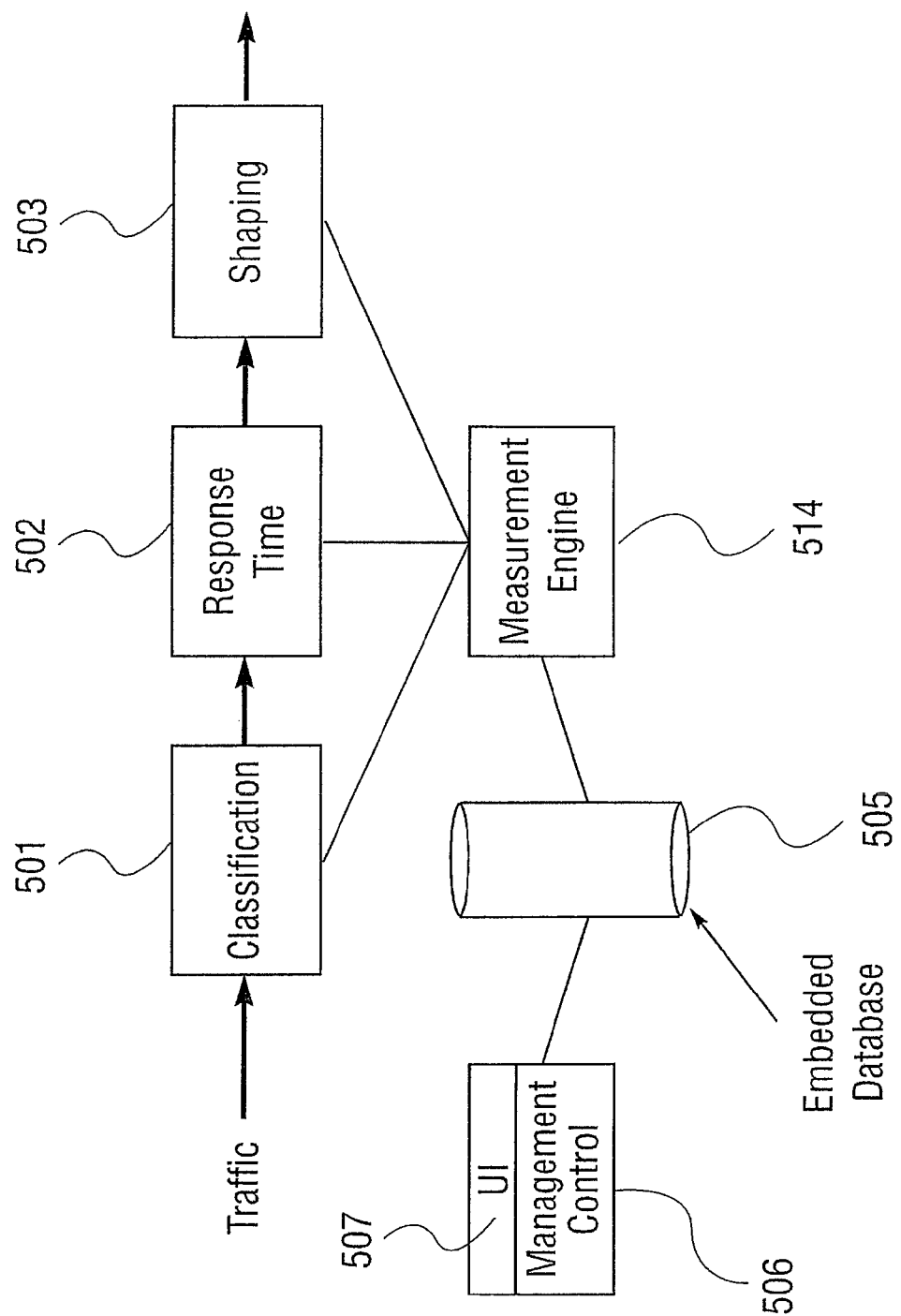
FIG. 5 is a data flow diagram of one embodiment of a network device.

FIG. 5 is a data flow diagram of one embodiment of a network device described herein. Referring to FIG. 5, a classification engine 501 classifies traffic in the traffic flow. Classification may be performed by using a classification tree. The traffic may be classified by all types of metrics. A classification model allows measurements of one type of traffic versus another type of traffic, one application versus another application, one customer versus another customer.

After classification, a response time block 502 monitors response time. Next, the traffic goes through shaping block 503 that performs any necessary shaping on the traffic. For more information on shaping, see U.S. application Ser. No. 08/977,376, entitled "Method for Managing Flow Bandwidth Utilization at Network, Transport and Application Layers," filed Nov. 24, 1997, now abandoned, incorporated herein by reference and assigned to the corporate assignee of the present invention.

Once classified, measurement engine 504 performs measurements to make determinations on comparable amounts of bandwidth. Essentially, the data is gathered, classified (e.g., on a per class basis), and then measurements are taken and grouped with other measurements associated with the same classification (e.g., according to application, application subtype, customer, subnet, etc.).

Measurement engine 504 provides probes to each of these blocks and stores measurements in embedded database 505. Measurement engine 504 records the congestion index sample in a "cumulative" variable as well as recording the number of samples in the bin corresponding to the traffic class. Each of the bins relates to a different classification type (e.g., application type). From these two measurements, an average congestion index can be determined.

Management control 505 fetches values from the embedded database 504 and quantifies and qualifies performance of the network based on these values. The results of the performance may be displayed through user interface 506.

For instance, a Citrix class of traffic may be monitored traffic in the inbound direction is measured as well as acknowledgements going in the other direction. The numbers recorded in the outbound Citrix flow reflect the delay or congestion index on one half of the traffic flow while the number recorded on the inbound reflect the delay on the other half. Thus, the Citrix flows are aggregated into 2 numbers, one on the inbound side (e.g., client portion 111) and one on the outbound side (e.g., provider portion 110). A comparison of the two may indicate whether a problem exists that is the responsibility of an application service provider.

The congestion index or other measurement values may be used to diagnose problems in the network and a determination of whether the problem is on the network provider side of the network or the customer side of the network. The diagnosis of a problem may be based on the fact that there is a difference in the congestion index values (or other measurement values) over time, based on the fact that the ratio of the congestion index (or other measurement values) on the provider side versus the same on the customer side are different, or whether such a ratio has changed, based on the fact that the congestion index (or other measurement values) on both sides has changed by the same amount (so as to diagnose that the problem may be one of heavy traffic as opposed to a problem in infrastructure). A diagnosis may also be based on detected variances in the congestion index (or other measure(s)) over time for the same network time period or variances in the congestion index (or other measure(s)) between different types of traffic.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:
monitoring, at a network device located at a demarcation point in a network, performance of a network application relative to a first network latency condition between a first transmission control protocol (TCP) host on a first side and the demarcation point and a second network latency condition between a second TCP host on a second side and the demarcation point;

wherein the first network latency condition is determined by:
   recording the arrival time, at the demarcation point, of packets transmitted by the second TCP host to the first TCP host;
   recording the arrival time, at the demarcation point, of respective acknowledgement packets corresponding to the packets transmitted by the second TCP host; and
   computing the difference between the arrival times of the packets and corresponding acknowledgement packets;
wherein the second network latency condition is determined by:
   recording the arrival time, at the demarcation point, of packets transmitted by the first TCP host to the second TCP host;
   recording the arrival time, at the demarcation point, of respective acknowledgement packets corresponding to the packets transmitted by the first TCP host;
   computing the difference between the arrival times of the packets and corresponding acknowledgement packets; and
ignoring duplicate data packets and acknowledgement packets transmitted by the first and second hosts.

2. The method of claim 1 further comprising
recording, at the demarcation point, the sequence number of each of the packets transmitted by the first and second TCP hosts; and
comparing the sequence numbers of the packets to sequence numbers in received acknowledgement packets to match the packets transmitted by the first and second TCP hosts to corresponding ones of the acknowledgement packets.

3. The method of claim 1 wherein monitoring performance of the network application further comprises measuring end-to-end performance of the network application with respect to the network.

4. The method of claim 1, wherein the demarcation point is located between a customer network and a provider network, and wherein monitoring performance of the network application comprises measuring congestion on the customer network and the provider network at the demarcation point between the customer network and the provider network.

5. A method comprising:
determining, at a network device located at a demarcation point in a network, a first latency condition between a first set of hosts in the network and the demarcation point and a second latency condition between the demarcation point and a second set of hosts in the network, wherein each of the hosts in the first and second sets are operative to transmit data packets and acknowledge received data packets;
wherein determining the first network latency condition comprises:
   recording the arrival time, at the network device, of data packets transmitted by a first host of the second set of hosts to a second host of the first set of hosts;
   recording the arrival time, at the network device, of respective acknowledgement packets transmitted by the second host corresponding to the data packets transmitted by the first host; and
   computing a difference between the arrival times of the data packets and corresponding acknowledgement packets; and
wherein determining the second network latency condition comprises:
   recording the arrival time, at the network device, of data packets transmitted by second host of the first set of hosts to the first host of the second set of hosts;
   recording the arrival time, at the network device, of respective acknowledgement packets transmitted by the first host corresponding to the data packets transmitted by the second host;
   computing a difference between the arrival times of the data packets and corresponding acknowledgement packets; and
ignoring acknowledgement packets having sequence numbers not greater than the sequence number of the last acknowledgement packet received.

6. The method of claim 5 further comprising
recording, at the network device, sequence numbers of each of the data packets transmitted by the first and second hosts; and
comparing the sequence numbers of the data packets to sequence numbers in received acknowledgement packets to match the data packets transmitted by the first and second hosts to corresponding ones of the acknowledgement packets.

7. A network device for use at a demarcation point in a network, the network device comprising:
a processor;
one or more non-transitory computer readable media;
a measurement engine comprising instructions included in the media, the instructions, when loaded and executed by the processor, are operative to cause the measurement engine to maintain information indicative of delays associated with one or more network applications occurring in the network, wherein the delays are based on at least a first delay between a first set of hosts on a first side and the demarcation point and a second delay between a second set of hosts on a second side and the demarcation point;
a memory coupled to the measurement engine to store the information indicative of the delays occurring in the network; and
one or more code modules stored in the non-transitory computer readable storage medium comprising instructions, the instructions, when loaded and executed by the processor, are operative to cause the network device to:
determine the first delay by:
   recording in the memory the arrival time, at the demarcation point, of packets transmitted by a second host in the second set of hosts to a first host in the first set of hosts;
   recording in the memory the arrival time, at the demarcation point, of respective acknowledgement packets corresponding to the packets transmitted by the second host; and
   computing the difference between the arrival times of the packets and corresponding acknowledgement packets; and
determine the second delay by:
   recording in the memory the arrival time, at the demarcation point, of packets transmitted by the first host to the second host;
   recording in the memory the arrival time, at the demarcation point, of respective acknowledgement packets corresponding to the packets transmitted by the first host;
   computing the difference between the arrival times of the packets and corresponding acknowledgement packets;

record, at the network device, sequence numbers of each of the data packets transmitted by the first and second hosts;

compare the sequence numbers of the data packets to sequence numbers in received acknowledgement packets to match the data packets transmitted by the first and second hosts to corresponding ones of the acknowledgement packets; and ignore data packets having sequence numbers lower than sequence numbers of previously received data packets.

8. A non-transitory computer readable medium comprising instructions that, when executed on a processor, cause the processor to:

monitor, at a network device located at a demarcation point in a network, performance of a network application relative to a first network latency condition between a first transmission control protocol (TCP) host on a first side and the demarcation point and a second network latency condition between a second TCP host on a second side and the demarcation point;

wherein the first network latency condition is determined by:

recording the arrival time, at the demarcation point, of packets transmitted by the second TCP host to the first TCP host;

recording the arrival time, at the demarcation point, of respective acknowledgement packets corresponding to the packets transmitted by the second TCP host; and computing the difference between the arrival times of the packets and corresponding acknowledgement packets;

wherein the second network latency condition is determined by:

recording the arrival time, at the demarcation point, of packets transmitted by the first TCP host to the second TCP host;

recording the arrival time, at the demarcation point, of respective acknowledgement packets corresponding to the packets transmitted by the first TCP host;

computing the difference between the arrival times of the packets and corresponding acknowledgement packets; and ignore duplicate data packets and acknowledgement packets transmitted by the first and second hosts.

9. The non-transitory computer readable medium of claim 8, wherein the instructions further cause the processor to:

record, at the demarcation point, the sequence number of each of the packets transmitted by the first and second TCP hosts; and compare the sequence numbers of the packets to sequence numbers in received acknowledgement packets to match the packets transmitted by the first and second TCP hosts to corresponding ones of the acknowledgement packets.

10. The non-transitory computer readable medium of claim 8, wherein monitoring performance of the network application further comprises measuring end-to-end performance of the network application with respect to the network.

11. The non-transitory computer readable medium of claim 8, wherein the demarcation point is located between a customer network and a provider network, and wherein monitoring performance of the network application comprises measuring congestion on the customer network and the provider network at the demarcation point between the customer network and the provider network.

12. A non-transitory computer readable medium comprising instructions that, when executed on a processor, cause the processor to:

determine, at a network device located at a demarcation point in a network, a first latency condition between a first set of hosts in the network and the demarcation point and a second latency condition between the demarcation point and a second set of hosts in the network, wherein each of the hosts in the first and second sets are operative to transmit data packets and acknowledge received data packets;

wherein determining the first network latency condition comprises:

recording the arrival time, at the network device, of data packets transmitted by a first host of the second set of hosts to a second host of the first set of hosts;

recording the arrival time, at the network device, of respective acknowledgement packets transmitted by the second host corresponding to the data packets transmitted by the first host; and computing a difference between the arrival times of the data packets and corresponding acknowledgement packets; and wherein determining the second network latency condition comprises:

recording the arrival time, at the network device, of data packets transmitted by second host of the first set of hosts to the first host of the second set of hosts;

recording the arrival time, at the network device, of respective acknowledgement packets transmitted by the first host corresponding to the data packets transmitted by the second host;

computing a difference between the arrival times of the data packets and corresponding acknowledgement packets; and ignore acknowledgement packets having sequence numbers not greater than the sequence number of the last acknowledgement packet received.

13. The medium of claim 12, wherein the instructions further cause the processor to:

record, at the network device, sequence numbers of each of the data packets transmitted by the first and second hosts; and compare the sequence numbers of the data packets to sequence numbers in received acknowledgement packets to match the data packets transmitted by the first and second hosts to corresponding ones of the acknowledgement packets.

14. A system, comprising:

a processor;

a non-transitory computer-readable medium communicatively coupled to the processor and comprising instructions, the instructions, when loaded and executed by the processor, cause the processor to:

monitor, at a network device located at a demarcation point in a network, performance of a network application relative to a first network latency condition between a first transmission control protocol (TCP) host on a first side and the demarcation point and a second network latency condition between a second TCP host on a second side and the demarcation point;

wherein the first network latency condition is determined by:

recording the arrival time, at the demarcation point, of packets transmitted by the second TCP host to the first TCP host;

recording the arrival time, at the demarcation point, of respective acknowledgement packets corresponding to the packets transmitted by the second TCP host; and computing the difference between the arrival times of the packets and corresponding acknowledgement packets;

wherein the second network latency condition is determined by:

recording the arrival time, at the demarcation point, of packets transmitted by the first TCP host to the second TCP host;

recording the arrival time, at the demarcation point, of respective acknowledgement packets corresponding to the packets transmitted by the first TCP host;

computing the difference between the arrival times of the packets and corresponding acknowledgement packets; and ignore duplicate data packets and acknowledgement packets transmitted by the first and second hosts.

15. The system of claim 14, wherein the medium further includes instructions for causing the processor to:

record, at the demarcation point, the sequence number of each of the packets transmitted by the first and second TCP hosts; and compare the sequence numbers of the packets to sequence numbers in received acknowledgement packets to match the packets transmitted by the first and second TCP hosts to corresponding ones of the acknowledgement packets.

16. The system of claim 14, wherein monitoring performance of the network application further comprises measuring end-to-end performance of the network application with respect to the network.

17. The system of claim 14, wherein the demarcation point is located between a customer network and a provider network, and wherein monitoring performance of the network application comprises measuring congestion on the customer network and the provider network at the demarcation point between the customer network and the provider network.

* * * * *